June 19, 1934.  W. W. MORRAL  1,963,141
GREEN CORN HUSKING MACHINE
Filed May 17, 1929  4 Sheets-Sheet 3

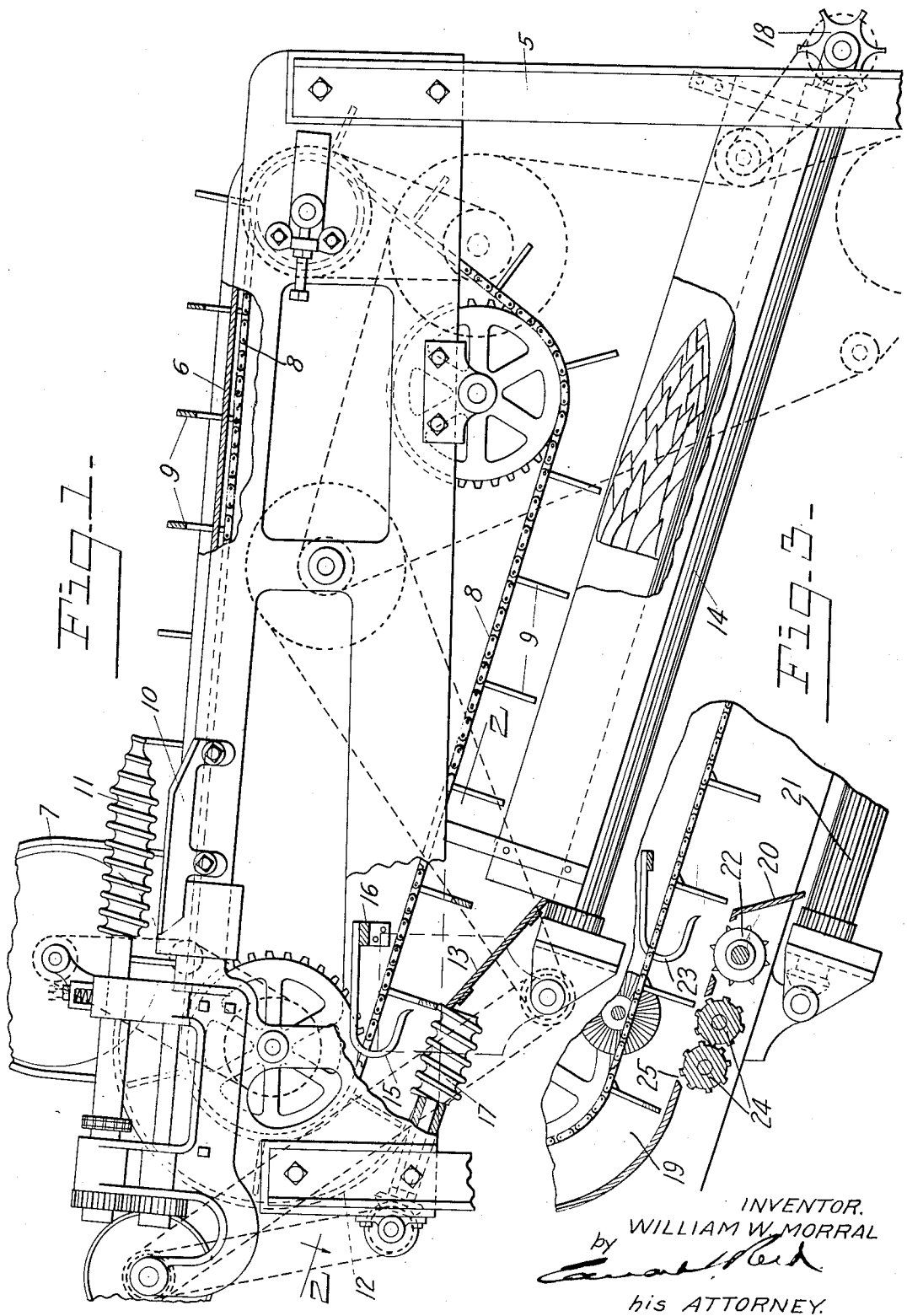

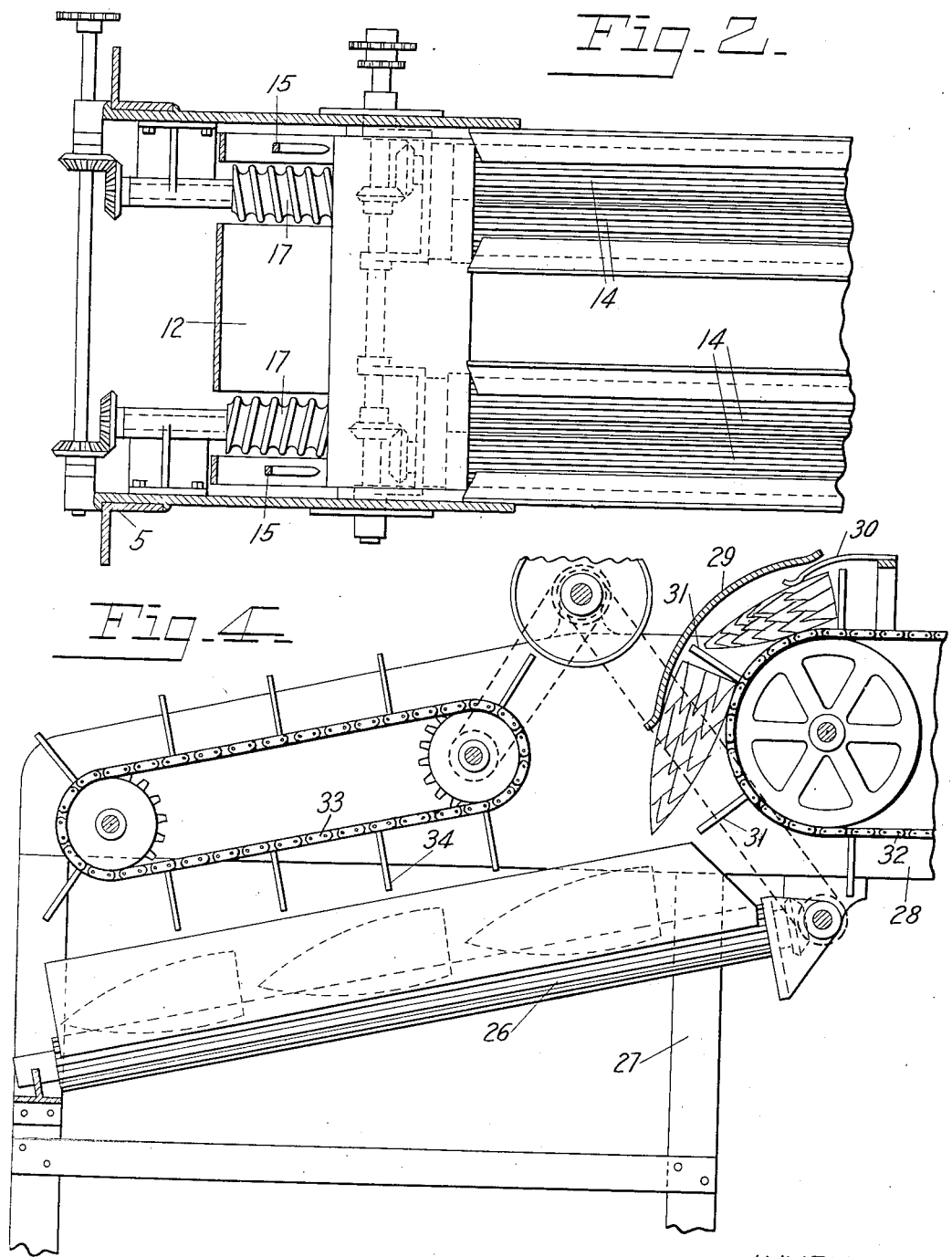

INVENTOR.
WILLIAM W. MORRAL.
by Edward L. Reed
his ATTORNEY.

June 19, 1934.  W. W. MORRAL  1,963,141
GREEN CORN HUSKING MACHINE
Filed May 17, 1929   4 Sheets-Sheet 4
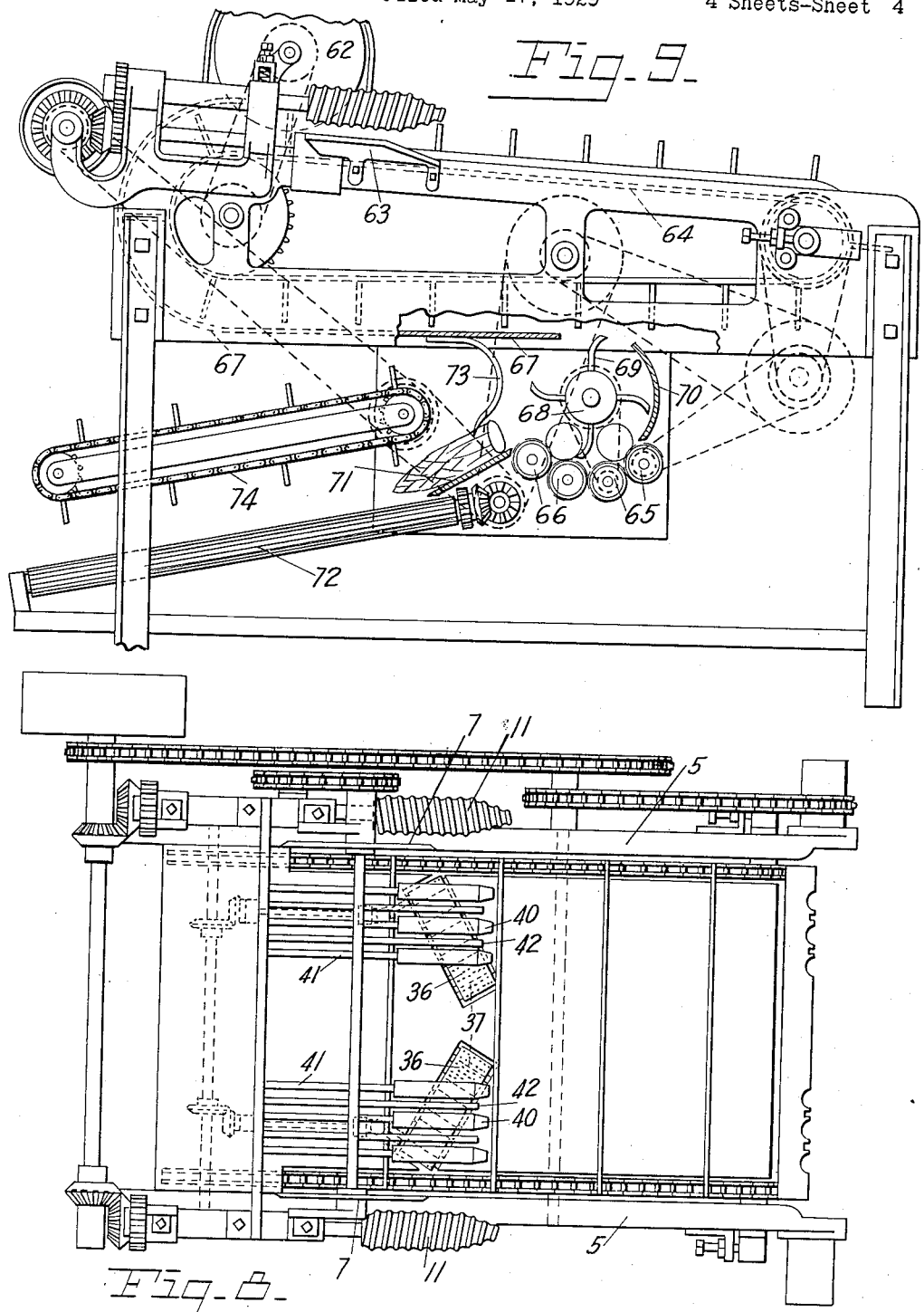
INVENTOR.
WILLIAM W. MORRAL.
by Edward W. Reed
his ATTORNEY.

Patented June 19, 1934

1,963,141

UNITED STATES PATENT OFFICE 1,963,141

GREEN CORN HUSKING MACHINE

William W. Morral, Morral, Ohio, assignor of one-half to Samuel E. Morral, Morral, Ohio Application May 17, 1929, Serial No. 363,777

11 Claims. (Cl. 130—5)

This invention relates to green corn husking machine and is in the nature of an improvement upon Patent No. 1,628,325, granted to me May 10, 1927.

In a machine of the type shown in the above mentioned patent the ears of corn are moved in a direction transverse to their length past a butt removing device and through an inclined or curved chute to husking rollers along which they move in the direction of their length, the husking rollers being inclined to permit the ears to move along them by gravity. When the ears of corn are moved along the husking rollers by the action of a conveyor the husking action is less satisfactory and there is a tendency on the part of the conveyor to carry pieces of husk along with the ears and deposit the same in the receptacle for the ears. To avoid this and permit the ears to move wholly by gravity the conveyor may be arranged so as to move out of engagement with the ears as the latter move onto the husking rollers. With such an arrangement an ear will sometimes lodge on the husking rollers and thus obstruct the movement of the succeeding ears, causing the ears to pile up until the lodged ear has been released.

One object of the present invention is to provide in a husking machine of this character an arrangement of conveyor and husking rollers which will permit the ears to move along the husking rollers by gravity but will prevent any piling up of the ears on the husking rollers.

It is, of course, necessary that the transversely moving ear shall be turned to a position parallel with its direction of travel before it is delivered to the husking rollers. The machine of the above mentioned patent shows two means for turning the ears, one being arranged to act on the ear as it enters the curved chute and the other being arranged to act on the ear as it is delivered from the chute to the husking rollers. Both turning means are controlled by gravity and neither is positive in its operation.

A further object of the present invention is, therefore, to provide means for positively turning the ear to properly position the same with relation to the husking rollers.

A further object of the invention is to provide improved means for positioning the ears of corn with relation to the butt removing device.

Other objects of the invention will appear as the mechanism is described in detail.

Figure 5:
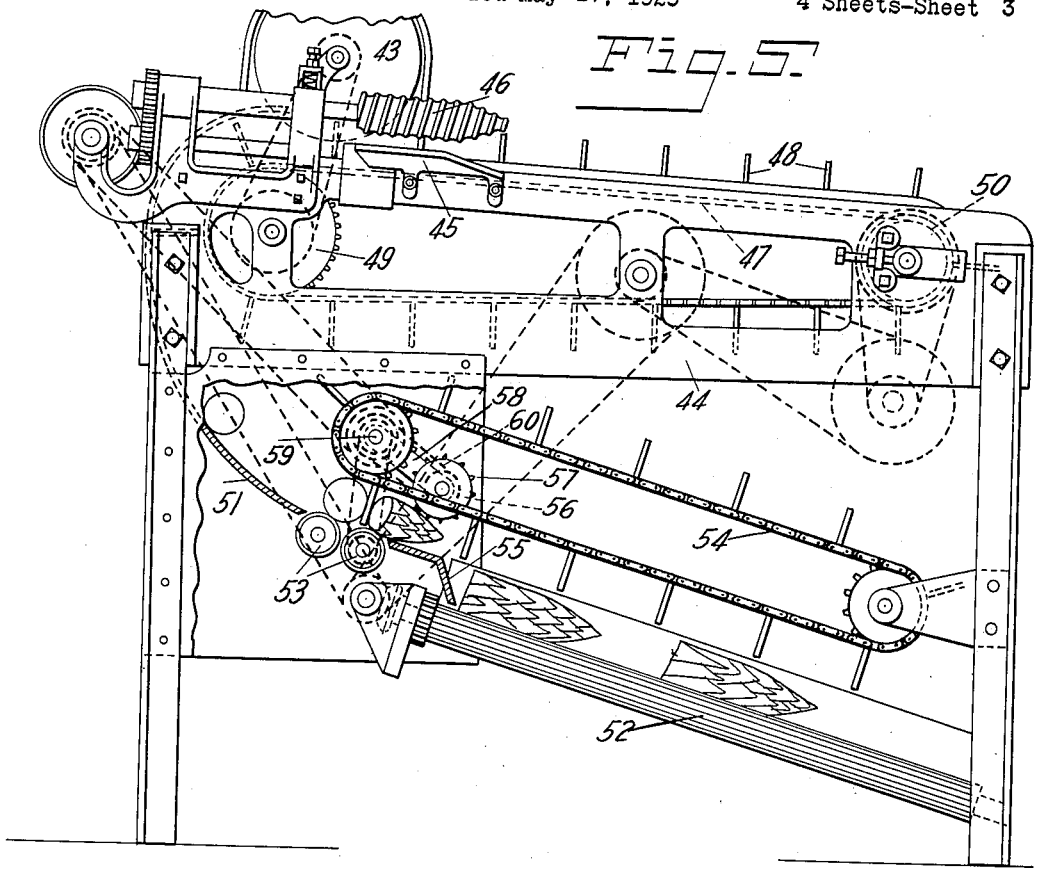
Figure 6:
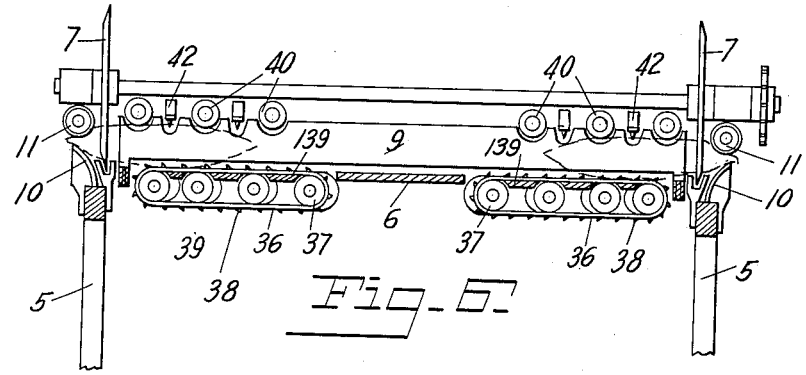
Figure 7:
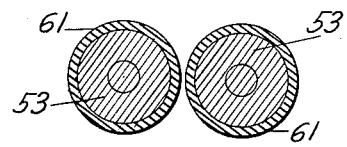

In the accompanying drawings Fig. 1 is a side elevation, partly broken away, of a corn husking machine embodying my invention; Fig. 2 is a plan view of portions of the husking rollers taken on the line 2—2 of Fig. 1; Fig. 3 is a fragmental view showing a modified form of ear turning device; Fig. 4 is a side elevation of another modified form of the machine showing a different arrangement of the husking rollers with relation to the butt removing mechanism; Fig. 5 is a side elevation, partly in section, of a further modification of the machine; Fig. 6 is a transverse sectional view showing the ear positioning devices; Fig. 7 is a transverse sectional view of the transverse husking rollers; Fig. 8 is a plan view of a portion of the machine showing the ear positioning devices; and Fig. 9 is a side elevation, partly in section, of another form of machine embodying the invention.

In these drawings I have illustrated certain embodiments of my invention but it will be understood that these have been chosen for the purposes of illustration only and that the invention may take various forms and may be applied to husking machines of various kinds.

The machine shown in Figs. 1 and 2 comprises a main frame 5 having near the top thereof a table 6 over which the ears of corn are moved in a direction transverse to their length to a butt removing device, which removes the butts therefrom, and the butted ears are then carried to the husking rollers. The machine here illustrated is a double husker and has two sets of butt removing devices and two sets of husking rollers, arranged at the respective sides of the machine, a single conveyor serving both sets of butt removing devices. Inasmuch as the two sets of mechanism are identical in construction and operation it will be necessary to describe but one of them.

The butt removing device is arranged near the rear end of the machine, at one side thereof, and preferably comprises a rotary cutter or disk 7 toward and past which the ears of corn are moved by a conveyor, preferably comprising a pair of endless chains 8 connected by ear engaging transverse members or flights 9. Arranged in advance of the butt removing device is a gaging device to properly position the ears with relation to the butt removing device. As here shown, this gaging device comprises a fixed gaging bar 10 and a spiral gaging roller 11 arranged above and spaced from the bar 10. Suitable means may be provided for moving the ears transversely to the direction of their travel to bring the butts thereof into engagement with the gaging device, and, as shown in Figs. 6 and 8, I have arranged adjacent to each gaging device a transversely movable belt 36. This belt is supported on drums 37 one of which is positively driven from the driving mechanism of the machine and the upper stretch of the belt is arranged substantially in the plane of the table 6, the table being provided with an opening or recess to receive the belt. If desired, the belt may be provided with prongs or teeth 38. As the ear of corn is advanced by a flight 9 of the conveyor it will be moved onto the transversely moving belt and will be moved endwise until its butt end engages with the gaging device. The belt is usually of considerable length and I prefer to provide means for supporting the intermediate portion of the upper stretch of the belt, which engages the ear, so as to prevent the belt from sagging in the middle. Any suitable support, rigid or otherwise, may be provided for this purpose. In the present instance, I have shown a plurality of rollers 39 arranged between the upper and lower stretches of the belt and engaging the upper stretch thereof, bars 139 being arranged between adjacent rollers. In order that the ear may be held firmly in contact with the belt throughout its entire movement thereby I have arranged above the belt a series of yieldable devices which will engage the ear and press the same firmly against the belt, these yieldable devices being so arranged that one or more of them will be in contact with the ear in all positions thereof as it moves toward the gaging device. In the present instance, these pressure devices comprise rollers 40 carried by springs rods 41 extending lengthwise of the machine. Also arranged above the transverse belts 36 and, in the present instance between the pressure rollers, are husk loosening devices 42 which comprise resilient arms extending lengthwise of the machine and having at their ends prongs to engage and tear the husks as the ear is advanced. The transverse belt or conveyor 36 may be arranged in any suitable position with relation to the main conveyor 8—9 but I prefer that the transverse belt shall be arranged obliquely to the line of movement of the main conveyor, with its outer end beyond its inner end, as shown in Fig. 8. The oblique arrangement permits a narrow transverse belt to be used and causes the transverse belt to advance the ear as well as to move it laterally, thereby reducing the frictional contact with the flights of the main conveyor, which would result if the ear was moved at right angles to the main conveyor.

The butted ears are delivered from the table 6 to a guideway or chute consisting of a main curved portion 12, through which the conveyor 8 travels, and an inclined portion 13 leading directly to the husking rollers 14. In this arrangement of the mechanism the husking rollers are arranged below the table 6, extend lengthwise of the main frame and are inclined downwardly and forwardly so that the ears of corn will move lengthwise thereof and the husks will be removed during the travel of the ears down the inclined husking rollers. The flights 9 on the conveyor are spaced apart such a distance that an ear of average length cannot be placed lengthwise between adjacent flights. When an ear enters the curved chute 12 it will drop by gravity against the preceding flight of the conveyor and will follow that flight through the curved portion of the chute to the inclined portion 13 thereof. The ear may be turned to a position parallel with the husking rollers in any suitable manner, as by contact with oppositely moving rollers, but I prefer to provide means which will positively act on the ear to cause it to turn. In the present machine and adjacent to the end of the main or curved portion of the chute is a retarding device adapted to engage one end of the ear and retard the movement thereof while the other end of the ear is advanced, thus causing the ear to be turned to a position substantially parallel with the direction of its movement. As here shown, this retarding device is in the form of a resilient arm 15 carried by a bracket 16 on the main frame and arranged above the transverse member or flights on the lower stretch of the conveyor but adapted to engage the upper side of an ear of corn moving through the chute. In order to positively turn the ear and insure its delivery to the husking rollers in proper position with relation thereto I have provided a turning device, which preferably consists of a rotatable member arranged to engage the ear at a point spaced from the retarding device and to advance that end of the ear which is engaged thereby. This turning device may take various forms and as shown in Figs. 1 and 2 it comprises a spiral roller 17 extending lengthwise of the lower portion of the main chute 12 and having its upper portion projecting through an opening in the bottom wall of the chute so that the spirals will engage the underside of an ear of corn and will advance that part of the ear with relation to the other end thereof, which is held by the retarding device, thus causing the ear to be delivered onto the inclined portion 13 of the chute lengthwise and permitting it to slide onto the husking rollers in proper position with relation thereto.

In that form of the mechanism shown in Figs. 1 and 2 the conveyor 8—9 passes through the curved body portion of the chute and extends along the husking rollers with its lower stretch substantially parallel with those rollers but spaced therefrom such a distance that the flights 9 will not engage an ear of corn, which is in proper position on the husking rollers, in such a manner as to impart movement thereto. As here shown, the flights will clear an ear of average size but a light contact of the flights with the ears is not objectionable. Consequently when the ear starts down the inclined portion 13 of the chute it moves it out of operative engagement with the conveyor and the remainder of its movement is by gravity. However, should an ear become lodged or "hung" on the husking rollers the following ears will pile up back of it and one or more of these ears will be vertically displaced to such an extent that it will be engaged by a flight of the conveyor which will move the same forward, thus applying pressure to and dislodging the lodged ear, thereby permitting the ears to continue their movement by gravity. A star wheel 18 moves upwardly between the longitudinal bearings for the two husking rollers to prevent small ears or pieces of ears from being wedged between these bearings and interfering with the discharge of the ears from the husking rollers.

In Fig. 3 I have shown a slightly modified form of the turning mechanism. As there shown, the main chute 19 has at its forward end a sharply inclined portion 20 leading to the husking rollers 21 and just in advance of this inclined portion 20 the lower wall of the main chute is slotted to receive a toothed wheel 22 which is so arranged that it will engage an ear of corn at a point spaced some distance from the retarding device 23, thus positively advancing that part of the ear and turning the latter to a position parallel with the direction of its movement. In this form of the device I have also provided a pair of initial husking rollers 24 which are located in a transverse opening 25 in the bottom wall of the chute 19 and across which the ears are moved transversely. These initial husking rollers will remove the coarse outer husks and the partially husked ears will be delivered to the husking rollers 21 which will remove the remainder of the husks.

In Fig. 4 I have shown a rearrangement of the husking rollers with relation to the main frame of the machine. As there shown, the husking rollers 26 are mounted on a supplemental frame 27, arranged at the rear end of the main frame 28, and are inclined downwardly and rearwardly. The ears are delivered from the butt removing device through an inclined chute 29 onto the husking rollers. A retarding device 30 engages one end of the ear as it enters this chute and causes it to swing by gravity into a longitudinal position, the flights 31 of conveyor 32 being spaced far enough apart to permit the ear to turn. Arranged above the husking rollers and parallel therewith is a second conveyor 33, which is so positioned with relation to the husking rollers that the flights 34 thereof will not operatively engage an ear of corn which is in proper position on the husking rollers but will engage an ear which has been vertically displaced with relation to the husking rollers, as above described. The second conveyor is driven from the main driving mechanism in properly timed relation to the movements of the first mentioned conveyor 32 and the husking rollers.

In Fig. 5 of the drawings I have shown a form of mechanism which is substantially similar to that shown in Figs. 1 and 3 with the exception that the feeding mechanism comprises two conveyors instead of a single conveyor. The butt removing device 43 is mounted on a main frame 44 as above described and a gaging device, comprising a fixed bar 45 and a spiral roller 46, is arranged for positioning the ear with relation to the butt removing device. The ear positioning devices are similar to the devices shown in Figs. 6 and 8. The main conveyor comprises an endless belt 47 having flights 48 to advance the ears, the upper stretch of this belt traveling over the feed table. In this instance the belt passes about sprocket wheels 49 and 50 arranged at the opposite ends of the main frame and the lower stretch of the conveyor is idle, the conveyor serving merely to move the ears toward and past the butt removing device and to discharge the same into a chute 51 which leads to the husking rollers. The husking rollers, which are shown at 52, extend lengthwise of the main frame and are inclined downwardly and forwardly so that the ears may move along the same by gravity. In the present illustration I have also shown a pair of transversely extending husking rollers 53 arranged in advance of the longitudinal husking rollers to remove the coarse outer husks from the ears. The chute 51 extends to the upper ends of the longitudinal husking rollers and is provided with an opening to receive the transverse husking rollers. A separate conveyor 54 is arranged above the two pairs of husking rollers and supported in such relation thereto that the ears of corn will be engaged by the flights of the conveyor and moved across the transverse husking rollers and onto the longitudinal rollers. The longitudinal rollers are arranged in a somewhat lower plane than the transverse rollers and the chute has a downwardly extending portion 55 to guide the ears onto the longitudinal rollers. The arrangement of the flights with relation to the longitudinal rollers is such that when an ear is in normal position upon the longitudinal rollers it will not be operatively engaged by the conveyor, but should it be vertically displaced with relation to the rollers it will be engaged by the conveyor and advanced. In this form of the device I have shown the positively rotated turning device as arranged above the ear. As here shown, it is in the form of a wheel 56 yieldably supported above the chute in such a position that it will engage the ear near the point thereof, and it is provided with projections or teeth 57 to positively advance that end of the ear. As here shown, the rotatable turning device is carried by arms 58 on the shaft 59 of the rear sprocket wheels for the conveyor 54 and it is driven from that shaft by a sprocket chain 60, the driving mechanism being such that the turning device will move at a speed somewhat greater than the speed of the conveyor. Consequently when the rotatable device engages the point of the ear this end of the ear will be advanced with relation to the butt end thereof and with relation to the conveyor so as to turn the ear lengthwise and cause it to be delivered to the longitudinal husking rollers substantially parallel therewith. It will be understood, of course, that the transverse husking rollers are not essential to the operation of the device and they may be omitted if desired.

The husking rollers may be of any suitable character but I find that the best results are secured if one or both of the transverse husking rollers are covered with rubber, or other similar material, while the longitudinal husking rollers are metal faced. In Figs. 5 and 7 I have shown transverse husking rollers 53 both having a covering of rubber 61. The longitudinal rollers are provided with longitudinal ribs which preferably intermesh after the manner of gear teeth, as shown by the transverse rollers 24 in Fig. 3.

In Fig. 9 I have shown the invention as embodied in still another machine. As here shown, the butt removing device 62, gaging device 63 and main conveyor 64, are substantially the same as shown in Fig. 5 but the machine is provided with two pairs of transverse husking rollers 65 and 66 which are arranged beneath the main conveyor and at a considerable distance from the rear end thereof. The chute 67 which receives the ears from the butt removing device has a horizontal portion extending rearwardly to a point above the transverse husking rollers and the lower stretch of the main conveyor serves to move the ears along this horizontal portion of the chute and to deliver the same to the transverse husking rollers. A separate feeding device is provided for moving the ears across the transverse husking rollers and, as here shown, this device comprises a rotatable drum or hub portion 68 having a plurality of radial arms 69, which are preferably curved and are spaced apart to receive the ears between them as the latter are discharged from the chute. A curved back wall or supplemental chute 70 retains the ears in the path of the arm 69 until they reach the first pair of husking rollers 65. The arms then carry the ears across both pairs of transverse husking rollers and deliver the same to a chute 71 which in turn delivers the ears to a pair of longitudinal husking rollers 72 which are inclined downwardly and rearwardly. An ear turning device engages the ears as they pass over the chute 71 to cause the same to turn into positions substantially parallel with the longitudinal husking rollers. As here shown, this ear turning device is in the form of a spring 73 which engages and retards the butt end of the ear so that the point of the ear will move forward by gravity. A conveyor 74 is arranged above the longitudinal husking rollers in the same relation thereto as was described in connection with the machine of Fig. 5.

It will be understood that the machines here illustrated may be either double huskers or single huskers but I prefer to employ the double husker because of its greater capacity and greater economy.

While I have shown and described certain embodiments of my invention I wish it to be understood that I do not desire to be limited to the details thereof as various modifications may occur to a person skilled in the art.

Having now fully described my invention what I claim as new and desire to secure by Letters Patent, is:

1. In a corn husking machine comprising longitudinally inclined husking rollers, a butt removing device, and a chute leading from said butt removing device to the upper ends of said husking rollers, an endless conveyor having its upper stretch arranged to move ears of corn past said butt removing device and having its lower stretch arranged substantially parallel with said inclined husking rollers and spaced therefrom such a distance that it will not operatively engage an ear of corn of average diameter which is properly positioned on said husking rollers, and rotatable means acting independently of said conveyor to positively turn an air of corn to a position parallel with said husking rollers as said ear is discharged from said chute.

2. In a corn husking machine comprising a guideway along which an ear of corn may be moved in a direction transverse to the length of said ear, a conveyor to move said ear along said guideway and husking rollers arranged in line with said guideway to receive an ear therefrom and along which said ear may move in the direction of its length, a rotary device to engage said ear and advance one end thereof beyond the other end thereof before it is delivered to said husking rollers.

3. In a corn husking machine comprising a guideway along which an ear of corn may be moved in a direction transverse to the length of said ear, and husking rollers arranged in line with said guideway to receive an ear therefrom and along which said ear may move in the direction of its length, a spiral roller extending in the direction of movement of said ear and arranged to engage said ear and turn the same to a position parallel with said husking rollers.

4. In a corn husking machine comprising a guideway along which an ear of corn may be moved in a direction transverse to the length of said ear, a conveyor to move said ear along said guideway and husking rollers arranged in line with said guideway to receive an ear therefrom and along which said ear may move in the direction of its length, means to engage said ear near one end thereof and retard the forward movement of said end, and a positively actuated device to engage said ear at a point spaced from said retarding means and advance the other end of said ear with relation to the first mentioned end thereof.

5. In a corn husking machine comprising a guideway along which an ear of corn may be moved in a direction transverse to the length of said ear, a conveyor to move said ear along said guideway and husking rollers arranged in line with said guideway to receive an ear therefrom and along which said ear may move in the direction of its length, means to engage the upper side of said ear near one end thereof and retard the forward movement of said end, and a positively actuated device to engage the lower side of said ear at a point between said retarding device and the other end of said ear and advance the last mentioned end with relation to the first mentioned end.

6. In a corn husking machine comprising a guideway along which an ear of corn may be moved in a direction transverse to the length of said ear, and husking rollers arranged in line with said guideway to receive an ear therefrom and along which said ear may move in the direction of its length, means to engage said ear near one end thereof and retard the forward movement of said end, and a spiral roller to engage said ear at a point spaced from said retarding device and advance the other end thereof with relation to the first mentioned end.

7. In a corn husking machine, a butt removing device, a pair of husking rollers, a curved chute leading from said butt removing device, a conveyor to move the ears past said butt removing device and extending through said curved chute, a resilient arm mounted near the discharge end of said chute to engage the upper side of an ear of corn near one end thereof and retard the forward movement of said end, and a positively actuated device extending through the lower wall of said chute to engage said ear at a point spaced from said retarding device and cause the free end of said ear to be advanced with relation to the retarded end thereof.

8. In a corn husking machine comprising a guideway along which an ear of corn may be moved in a direction transverse to the length of said ear, a conveyor to move said ear along said guideway and husking rollers arranged in line with said guideway to receive an ear of corn therefrom and along which said ear may be moved in the direction of its length, and a positively rotated member having projections to engage said ear and turn the same to a position substantially parallel with the direction of its movement.

9. In a corn husking machine comprising a butt removing device and inclined husking rollers to receive an ear of corn from which the butt has been removed, a conveyor to move an ear of corn past said butt removing device and cause the same to be delivered to said husking rollers, and a second conveyor movable lengthwise of said husking rollers and so arranged with relation thereto that it will not operatively engage an ear of corn which is properly positioned on said husking rollers but will engage and advance an ear of corn which has been displaced with relation to said husking rollers.

10. In a corn husking machine comprising a butt removing device and inclined husking rollers to receive an ear of corn from which the butt has been removed, a conveyor to move an ear of corn past said butt removing device and cause the same to be delivered to said husking rollers, a chute to receive an ear of corn from said conveyor and guide the same to said husking rollers, and an endless conveyor having its lower stretch arranged above said husking rollers, said endless conveyor being provided with flights so arranged with relation to said husking rollers that they will not engage an ear of corn properly positioned thereon but will engage and advance an ear of corn which has been vertically displaced with relation to said husking rollers.

11. In a corn husking machine comprising a butt removing device, inclined husking rollers extending lengthwise of the machine, and transverse husking rollers arranged in advance of said longitudinal husking rollers, a conveyor to move an ear of corn past said butt removing device and cause the same to be delivered to said transverse husking rollers, a rotatable feeding member arranged above said transverse husking rollers and having substantially radial arms to engage said ear of corn and move the same across said transverse husking rollers and to cause said ear to be delivered to said longitudinal husking rollers, and a conveyor extending lengthwise of said longitudinal husking rollers and so arranged with relation thereto that it will not operatively engage an ear of corn which is properly positioned on said longitudinal husking rollers but will engage and advance an ear of corn which has been displaced with relation to said husking rollers.

WILLIAM W. MORRAL.